`US010969843B2`

United States Patent
Kwatra et al.

(10) Patent No.: US 10,969,843 B2
(45) Date of Patent: Apr. 6, 2021

(54) DEVICE-TO-DEVICE WIRELESS POWER TRANSFER TO PROVIDE CONTENT DISPLAY CONTINUITY

(71) Applicant: International Business Machines Corporation, Armonk, NY (US)

(72) Inventors: Shikhar Kwatra, Durham, NC (US); Jeremy R. Fox, Georgetown, TX (US); Mauro Marzorati, Lutz, FL (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 16/181,958

(22) Filed: Nov. 6, 2018

(65) Prior Publication Data
US 2020/0142460 A1    May 7, 2020

(51) Int. Cl.
| | |
|---|---|
| *G06F 1/26* | (2006.01) |
| *H02J 50/80* | (2016.01) |
| *G06F 3/01* | (2006.01) |
| *H04W 4/20* | (2018.01) |

(52) U.S. Cl.
CPC ............... *G06F 1/26* (2013.01); *H02J 50/80* (2016.02); *G06F 3/013* (2013.01); *H04W 4/20* (2013.01)

(58) Field of Classification Search
None
See application file for complete search history.

(56) References Cited

U.S. PATENT DOCUMENTS

| | | |
|---|---|---|
| 9,576,309 B2 | 2/2017 | Bollman |
| 9,843,213 B2 | 12/2017 | Leabman et al. |
| 9,867,017 B1 | 1/2018 | Bacarella et al. |
| 9,979,241 B2 | 5/2018 | Park |
| 9,986,513 B1 | 5/2018 | Liu et al. |
| 10,020,684 B2 | 7/2018 | Porat et al. |
| 10,021,654 B2 | 7/2018 | Kim et al. |
| 10,027,182 B2 | 7/2018 | Eguchi |
| 2011/0016333 A1 | 1/2011 | Scott et al. |
| 2012/0210325 A1* | 8/2012 | de Lind Van Wijngaarden .......... G06F 1/329 718/103 |

(Continued)

OTHER PUBLICATIONS

Shi et al.; "Wireless Power Hotspot That Charges All of Your Devices", MobiCom'15, 21st Annual ACM International Conference on, Sep. 7-11, 2015, pp. 2-13.

(Continued)

*Primary Examiner* — Fahmida Rahman
(74) *Attorney, Agent, or Firm* — Anthony V England; Edell, Shapiro & Finnan, LLC (57) ABSTRACT

A system transfers power between a plurality of devices. Content is displayed to a group of users. An amount of power required by the system to at least complete display of the content is determined. In response to the required amount of power exceeding the power in a rechargeable power source of the system, one or more devices that are associated with users of the group are identified, wherein the identified devices each include a power source. Power is wirelessly received from the identified one or more devices. Embodiments of the present invention further include a method and program product for transferring power between a plurality of devices in substantially the same manner described above.

15 Claims, 4 Drawing Sheets

(56) References Cited

U.S. PATENT DOCUMENTS

| | | | |
|---|---|---|---|
| 2013/0046967 A1* | 2/2013 | Fullerton | H03K 3/0315 |
| | | | 713/100 |
| 2017/0040831 A1 | 2/2017 | Desai et al. | |
| 2017/0045932 A1* | 2/2017 | Bostick | G06F 1/3296 |
| 2017/0199794 A1 | 7/2017 | Byers et al. | |
| 2018/0175672 A1 | 6/2018 | Yoden | |
| 2019/0312459 A1* | 10/2019 | Garbus | G06F 3/03545 |

OTHER PUBLICATIONS

Chang et al.; "Energy Efficient Resource Allocation for Wireless . . . Clouds", IEEE Jour. On Selected Areas in communications, vol. 34, Iss. 12, Dec. 2016, pp. 3438-3450.

Uchida et al.; "Three-Dimensional Wireless Power Transfer Method . . . Of IoT Devices", Fujitsu Scientific & Technical Journal, vol. 53, No. 2, Feb. 2017, pp. 51-56.

Liu et al.; "Mobile Energy Internet", Cornell University Library, arXiv:1802.01570v2 [eess.Sp], Feb. 2018, pp. 1-17.

\* cited by examiner

DEVICE-TO-DEVICE WIRELESS POWER TRANSFER TO PROVIDE CONTENT DISPLAY CONTINUITY

BACKGROUND

1. Technical Field

Present invention embodiments relate device-to-device wireless power transfer.

2. Discussion of the Related Art

Mobile devices may be used to present a variety of content, such as audio content and video content. For example, a user may watch a sporting event, read a book, or listen to a song using his or her mobile device. When content is presented on a mobile device for an extended period of time, the mobile device may require recharging.

SUMMARY

According to one embodiment of the present invention, a system transfers power between a plurality of devices. Content is displayed to a group of users. An amount of power required by the system to at least complete display of the content is determined. In response to the required amount of power exceeding the power in a rechargeable power source of the system, one or more devices that are associated with users of the group are identified, wherein the identified devices each include a power source. Power is wirelessly received from the identified one or more devices. Embodiments of the present invention further include a method and program product for transferring power between a plurality of devices in substantially the same manner described above.

BRIEF DESCRIPTION OF THE DRAWINGS

Generally, like reference numerals in the various figures are utilized to designate like components.

DETAILED DESCRIPTION

Present invention embodiments involve a recognition that when a mobile device requires recharging, this may necessitate interruption of the displayed content. This may particularly arise when content is presented on a mobile device for an extended period of time. For example, a user may have to pause a video in order to locate a power source suitable for charging the mobile device. The embodiments also involve a recognition of issues associated with this situation. If a user is outdoors or is traveling, for example, there may not be a power source nearby, and the user may not be able to finish consuming the presented content before the mobile device runs out of power.

Present invention embodiments relate generally to device-to-device wireless power transfer, and more specifically, to performing device-to-device wireless power transfer in order to provide content display continuity. When content is displayed on a mobile device, such as a smartphone, tablet, or laptop, the device may not have enough power stored in the battery to finish displaying the content. For example, if a user wishes to watch a movie on a smartphone, the amount of power required by the smartphone to play the entire movie may exceed the amount of power currently stored in the smartphone's battery. However, when a user is out with friends, family, or colleagues, it is likely that there are other nearby mobile devices whose batteries could provide a sufficient amount of power to complete display of the content.

Present invention embodiments utilize device-to-device wireless power transference to ensure the continuous, uninterrupted display of content on a device by providing the device with power from one or more nearby devices. For example, when a user is watching a video on his or her mobile device, present invention embodiments may detect that the mobile device's battery is not sufficiently charged for the device to complete playback of the video. In this case, the mobile device may request for a nearby donor device to provide power to the mobile device. If the donor device accepts, then the donor device wirelessly transfers power to the mobile device to ensure uninterrupted playback of the video.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
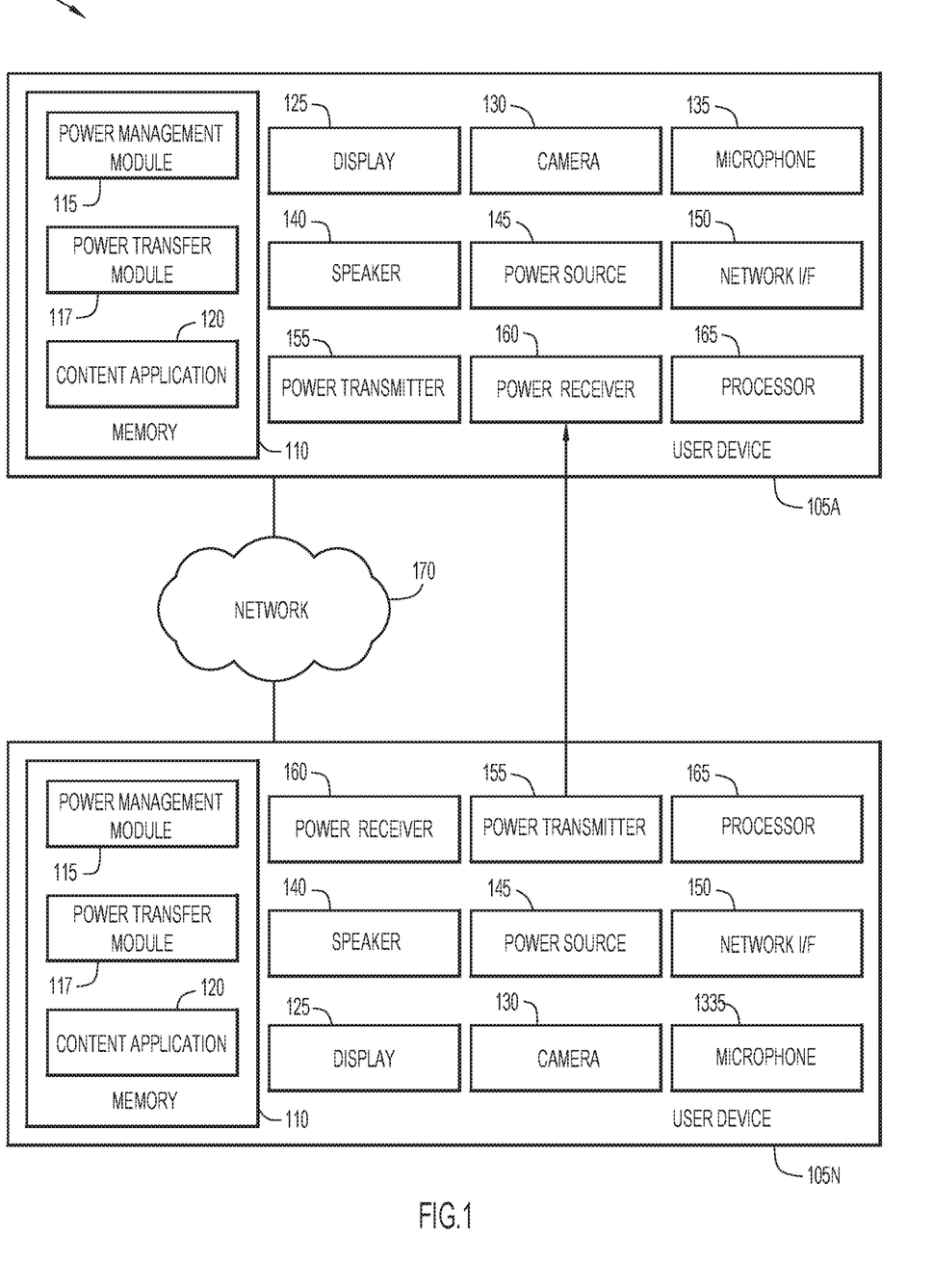
FIG. 1 is a block diagram depicting a computing environment for providing device-to-device wireless power transfer in accordance with an embodiment of the present invention.

Present invention embodiments will now be described in detail with reference to the Figures. FIG. 1 is a block diagram depicting a computing environment 100 for providing device-to-device wireless power transfer in accordance with an embodiment of the present invention. As depicted, computing environment 100 includes at least two user devices 105A and 105N. It is to be understood that the functional division among components of computing environment 100 have been chosen for purposes of explaining the present invention and is not to be construed as a limiting example.

Each user device 105 includes memory 110, a display 125, a camera 130, a microphone 135, a speaker 140, a power source 145, a network interface 150, a power transmitter 155, a power receiver 160, and at least one processor 165. Memory 110 may include a power management module 115, a power transfer module 117, and a content application 120. In various embodiments of the present invention, each user device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 150 enables components of user device 105 to send and receive data over a network, such as network 170. User device 105 may include internal and external hardware components, as depicted and described in further detail with respect to FIG. 4. In the depicted example, user device 105A is presented as a device that is receiving a transfer of power from user device 105N, which is acting as a donor device. It is to be understood that while user devices 105A and 105N have been depicted in computing environment 100 as having the same components, in various embodiments, a donor device may have fewer components; for example, a donor device may only include power transmitter 155, power source 145, power management module 115, and/or power transfer module 117.

Power management module 115, power transfer module 117, and content application 120 may include one or more modules or units to perform various functions of present invention embodiments described below. Power management module 115, power transfer module 117, and content application 120 may be implemented by any combination of any quantity of software and/or hardware modules or units, and may reside within memory 110 of user device 105 for execution by a processor, such as processor 165.

Power management module 115 may monitor the charge level of a power source, such as power source 145 of user device 105. Power management module 115 may also calculate projected future power usage of user device 105 when content is presented on user device 105. By projecting the amount of power that will be used to present content, power management module 115 may predict the charge level of power source 145 after media content has been displayed.

As an example, playing a video on user device 105 may draw a total current of 1.2 amps, including the amount of current to activate elements of a display, to generate audio, to decompress the video data, and the like. If the video is two hours long, then power management module 115 may determine that a total of 2.4 amp-hours to play the video. However, if the power source of user device 105 only has a remaining stored charge of 2.0 amp-hours, then power management module 115 can predict that user device 105 will be unable to display the entire video, and will require an additional 0.4 amp-hours of charge in order to present the video in its entirety. In some embodiments, power management module 115 may overestimate predicted charge consumption values by a predetermined amount. For example, it may be difficult to accurately predict the amount of charge that will be consumed by a video due to a varying rate of power consumption, so power management module 115 may overestimate the video's predicted power consumption by a predetermined factor, such as 5%, 10%, 20%, etc. Thus, if power management module 115 overestimates power consumption by 5%, then power management module 115 may predict that displaying a two-hour long video that is estimated to draw a current of 1.2 amps may consume up to 2 h×1.2 A×105% of charge, or 2.52 Ah of charge.

In some embodiments, power management module 115 may perform a contextual analysis of displayed content, including analyzing metadata relating to the content, in order to predict the remaining duration of the content. For example, in the case of a television show, metadata relating to the show and/or a program guide may indicate the length of the show. For live broadcasts, such as sporting events, power management module 115 may estimate the remaining length. For example, power management module 115 may determine that the displayed content is a sporting event, and perform image processing on a scoreboard to determine that there are fifteen minutes remaining in the event.

In some embodiments, power management module 115 may determine whether a device, such as user device 105N, has enough stored power to act as a donor device in order to fulfill a request for power by a recipient device, such as user device 105A. For example, when user device 105N receives a request to wirelessly transfer power to another device, power management module 115 may perform a check to ensure that power source 145 of user device 105N has enough charge to fulfill the request. In some embodiments, power management module 115 may prevent a power transfer from user device 105N if fulfilling the request would drain power source 145 of user device 105N past a threshold amount. For example, power management module 115 may not authorize a power transfer if fulfilling the transfer would result in power source 145 of user device 105N having less than 20% charge.

Power transfer module 117 may find one or more nearby compatible devices that can wirelessly transmit power to a user device. For example, power transfer module 117 of user device 105A may discover that user device 105N is a donor device that is compatible with user device 105A, and therefore user device 105N may transmit power to user device 105A. Power transfer module 117 may send requests for power in the case of a recipient device, such as user device 105A, and may receive requests for power in the case of a donor device, such as user device 105N. For example, power transfer module 117 of user device 105N may receive a request for a power transfer from power transfer module 117 of user device 105A. In some embodiments, requests may be sent over a network, such as network 170. Additionally or alternatively, requests may be encoded in an audio signal that is output from speaker 140 of user device 105A and received by microphone 135 of user device 105N. A request sent over an audio channel may be encoded such that it is not noticeable by human listeners; for example, the request may be encoded in an audio signal such that the request falls outside the range of human hearing (e.g., below 20 Hz or above 20 kHz), or the request may be encoded in audio using conventional or other steganographic techniques.

Content application 120 many include any application capable of presenting content to a user of user device 105. Content may include any media or combination of media, such as audio, video, still images, text, a game, and the like. Content application 120 may provide data, including metadata relating to content being displayed, to power management module 115 so that power management module 115 may estimate power usage of displayed content. In some embodiments, power management module 115 and/or power transfer module 117 are plug-in applications to content application 120.

Display 125 may include any output device for presenting information in a visual form, such as a liquid crystal display (LCD), a cathode ray tube (CRT) display, or a light-emitting diode (LED) display. Camera 130 may be any conventional or other image capture device capable of still photography and/or videography. Microphone 135 may include any transducer capable of converting sound to an electrical signal, and speaker 140 may include any transducer capable of converting an electrical signal to sound. Power source 145 may provide power to user device 105 and may include any combination of conventional or other rechargeable electrochemical cells or other rechargeable energy storage device.

Power transmitter 155 may include any transmitter capable of wirelessly transmitting power, and power receiver 160 may include any receiver capable of wirelessly receiving power. In some embodiments, power transmitter 155 and power receiver 160 may be combined as a transceiving component. Power transmitter 155 may be electrically coupled to power source 145 so that power transmitter 155 may draw power from power source 145 when transmitting; likewise, power receiver 160 may be electrically coupled to power source 145 so that power source 145 may be provided with electrical charge when power receiver 160 receives power. Wireless transmission of power may be achieved according to conventional or other techniques, including near-field transmission (including capacitive coupling, inductive coupling, magnetodynamic coupling, etc.), far-field techniques (e.g., using lasers or microwaves), or any combinations thereof.

Network 170 may include a local area network (LAN), a wide area network (WAN) such as the Internet, or a combination of the two, and includes wired, wireless, or fiber optic connections. In general, network 170 can be any combination of connections and protocols that will support communications between user devices 105A and 105N in accordance with embodiments of the present invention.

Figure 2:
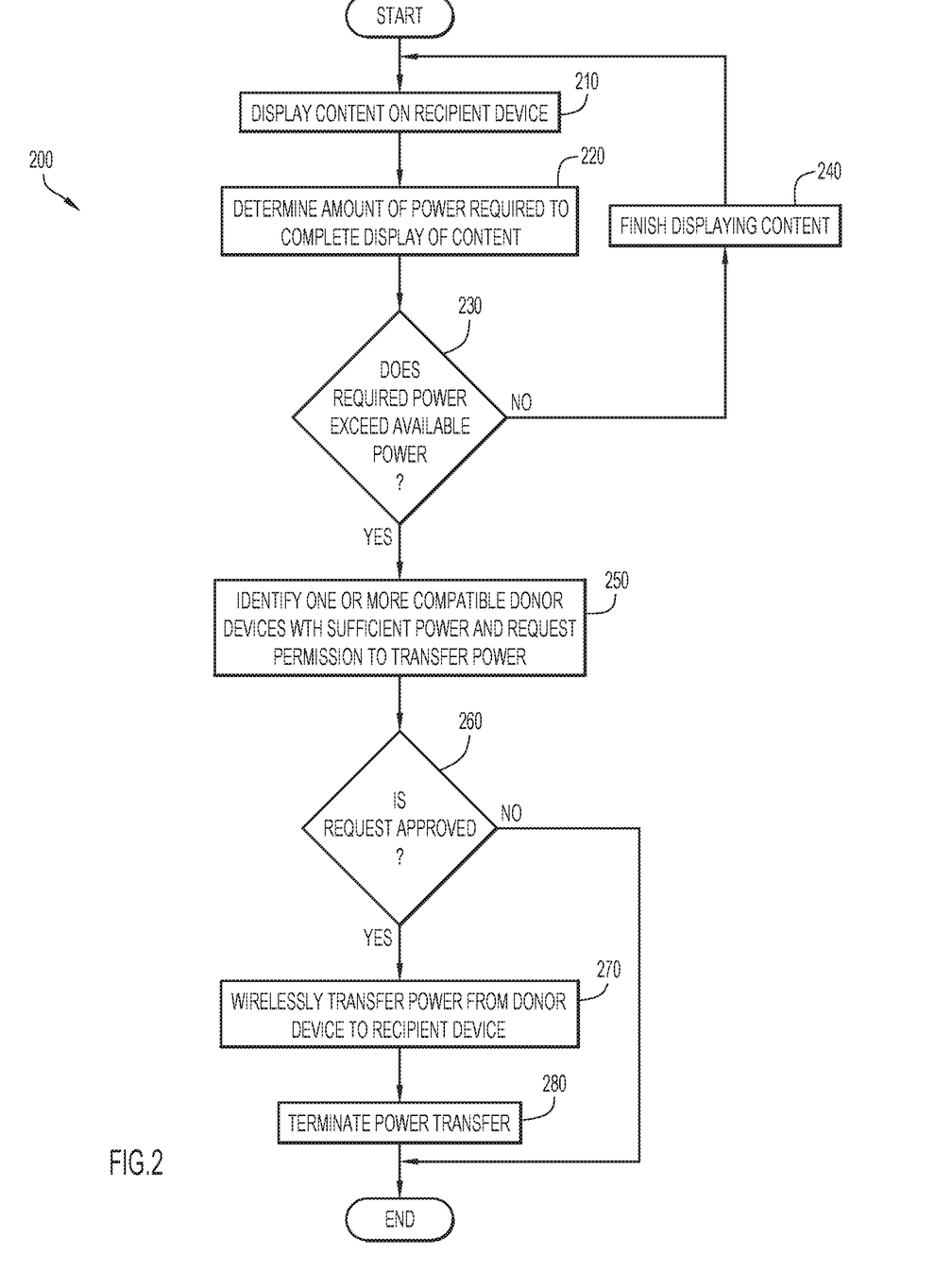
FIG. 2 is a flow chart depicting a method of providing device-to-device wireless power transfer in accordance with an embodiment of the present invention.

FIG. 2 is a flow chart depicting a method 200 of providing device-to-device wireless power transfer in accordance with an embodiment of the present invention.

Content is displayed on a first device at operation 210. A user may interact with a recipient device, such as user device 105A, in order to display content. Content application 120 may present content, including audio and video content, on user device 105A using display 125 and speaker 140. In some embodiments, the content on the first device is displayed to a group of users, as determined by processing one or more images captured by camera 130 using conventional or other image processing techniques.

An amount of power required to finish displaying of the content is determined at operation 220. Based on properties of the content, such as the length of the content and amount of processing power required to present the content, power management module 115 may estimate an amount of power that user device 105A will consume in presenting the content in its entirety.

Operation 230 determines whether the power required to finish displaying the content exceeds the available power. Power management module 115 may compare the estimated amount of power that will be required to completely present the displayed content against the amount of power that can be supplied by the device's power source. In some embodiments, the power requirement that is estimated by power management module 115 also includes an amount of power to perform one or more additional actions after completion of the display of content, such as an amount of power that will support the use of another application for a predetermined amount of time. Power management module 115 may also factor in the estimated rate of transfer of power from a donor device to the recipient device when calculating how much power will be required to ensure that the content is completely displayed. If the device's power source can support presentation of the content in its entirety, the first device may finish displaying the content at operation 240.

If the device's power source cannot support presentation of content in its entirety, one or more compatible donor devices having sufficient power may be identified and sent a request to transfer power to the recipient device at operation 250. In some embodiments, the recipient device may send a request for power transfer to any nearby devices that are within a predetermined range. For example, user device 105A may send a request using a near-field communication protocol, a Bluetooth® protocol, or any other protocol that enables user device 105A to participate in two-way communication with nearby devices. In some embodiments, requests are sent to any nearby devices that have previously interacted with the recipient device or are otherwise associated with the recipient device. For example, requests may be sent to any device that has previously served as a power donor to the recipient device, and/or sent to any device belonging to a user who is a contact of the user associated with the recipient device. In some embodiments, user device 105A may not send requests to any device whose own power source cannot provide the amount of power to user device 105A that is required to present the content.

Operation 260 determines whether the request has been approved. When a compatible device receives a request, the compatible device may present a notification to the user of the device, who can then choose to accept or deny the request to initiate wireless power transfer. In some embodiments, the notification is generated by a power transfer module of the donor device, such as power transfer module 117 of user device 105N. When the request is approved, the donor device may send a notification to the recipient device and begin to transfer the requested amount of power; alternatively, the donor device may indicate acceptance by initiating the power transfer. In some embodiments, a request to transfer power is denied when the requested device cannot support the transfer. For example, when a device's power source does not contain enough charge to meet the requested amount, the device may deny the request. In some embodiments, when a donor device has previously provided power to the recipient device, a request to transfer power may be automatically approved. Alternatively or additionally, devices may add each other to whitelists in order to pre-approve requests.

Power is wirelessly transferred from a donor device to the recipient device at operation 270. Once a donor device, such as user device 105N, approves of the power transfer, the donor device may begin transferring power to the recipient device. In some embodiments, operations 250, 260, and 270 may occur multiple times simultaneously or sequentially, in order to ensure that the recipient device is provided with enough power, with power being provided by a different donor device each time. For example, if a first donor device is incapable of meeting the recipient device's demand for power, a second donor device may provide power as well, either during or after the transference of power from the first donor device to the recipient device.

Power transfer is terminated at operation 280. Power transfer may be terminated upon the occurrence of one or more conditions, including successful completion of the power transfer, completion of the content being displayed, and/or detection of user disinterest. The termination of a power transfer will be discussed in greater detail with reference to FIG. 3.

Figure 3:
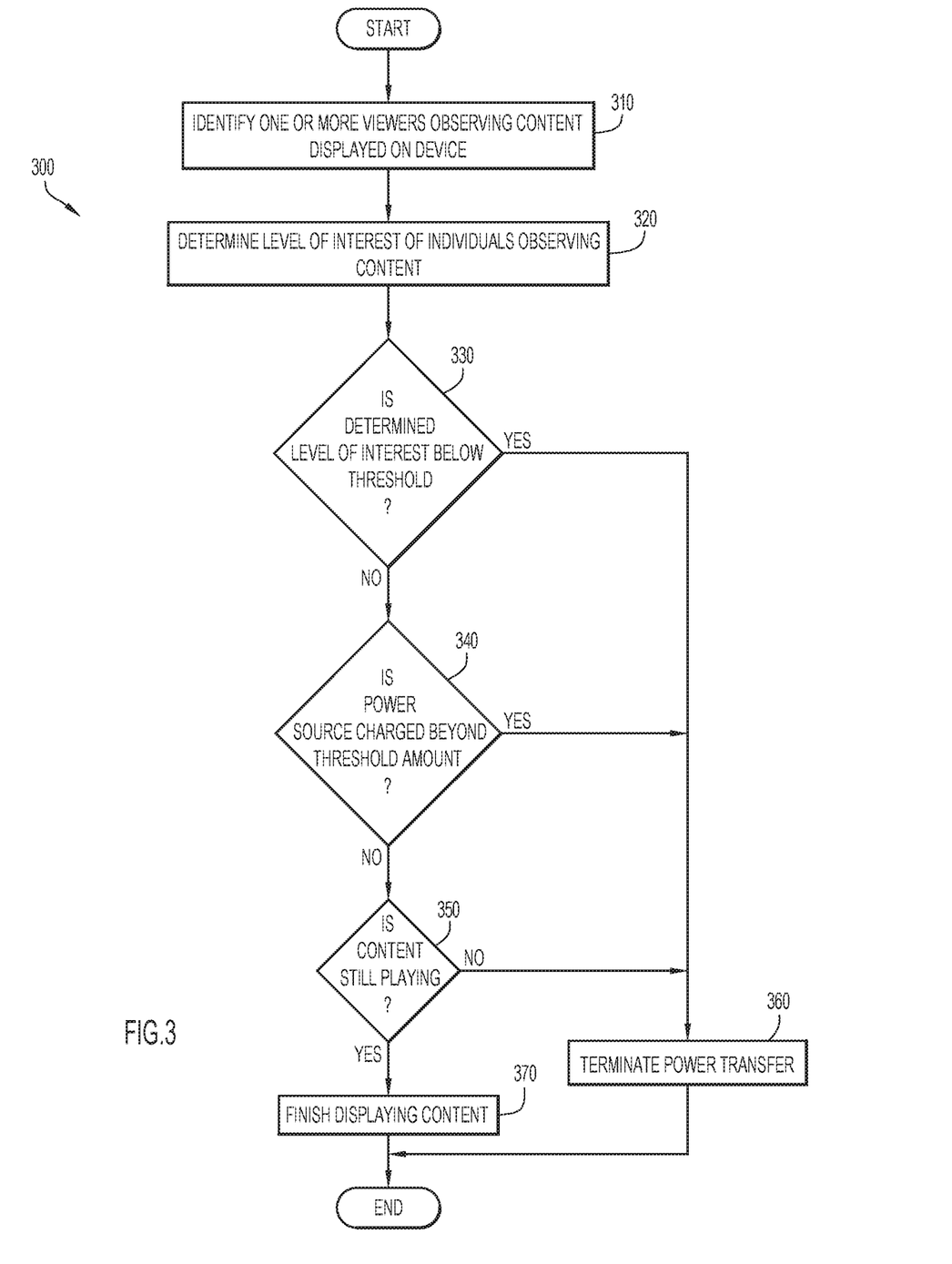
FIG. 3 is a flow chart depicting a method of terminating a power transfer in accordance with an embodiment of the present invention.

FIG. 3 is a flow chart depicting a method 300 of terminating a power transfer in accordance with an embodiment of the present invention.

One or more viewers observing content being displayed on a device are identified at operation 310. Camera 130 of user device 105A may capture one or more images, which can be processed using conventional or other image processing techniques to detect whether viewers are observing content on device 105A. Eye-tracking techniques may be employed to determine whether the gaze of each viewer is directed toward display 125 of user device 105A.

A level of interest is determined for each viewer observing the content at operation 320. In some embodiments, level of interest can be determined according to an amount of time that a viewer observes content as it is displayed on user device 105A. For example, using eye-tracking technology, if a viewer's gaze is directed toward display 125 of user device 105A for 90% of the time that content is being presented, then it may be determined that the viewer is interested in the content. In various embodiments, the amount of time that a user's attention must be directed toward displayed content can be determined according to any pre-defined value.

Operation 330 determines whether the viewer's level of interest is below a threshold. If the viewer's interest falls below a particular threshold, then the power transfer to user device 105A may be terminated at operation 360. In the case of multiple viewers, if the interest level of each viewer falls below a predetermined threshold, the power transfer may be terminated. In some embodiments, if the interest level of a predetermined number of viewers falls below a predetermined threshold, the power transfer may be terminated. For example, if three out of five viewers are no longer viewing displayed content, then the power transfer may be terminated.

Operation 340 determines whether the device's power source is charged beyond a threshold amount. If the power source 145 of user device 105A is charged beyond a threshold amount, then the transfer of power to user device 105A may be terminated at operation 360. The threshold amount of charge may be based on the estimated amount of power that user device 105A is expected to consume in order to display the selected content, which may be calculated by power management module 115.

Operation 350 determines whether content is still being displayed on the device. If the content finishes naturally and/or if a user manually pauses or stops the presentation of content, then power transfer may be terminated at operation 360. In some embodiments, playback of content must be interrupted for a predetermined amount of time before the power transfer is terminated. For example, if a user pauses a video for longer than a predefined amount of time, such as one minute, then power transfer may be terminated.

The wireless transfer of power is terminated at operation 360. When the outcome of operation 330, operation 340, or operation 350 results in a termination of power transfer, then the recipient device, such as user device 105A, may send a request to the donor device, such as user device 105N, to terminate the transfer of power.

Display of the content is permitted to finish at operation 370. If the result of the decisions at operations 330, 340, and 350 do not result in a termination of the power transfer, then user device 105A may proceed to finish display of content while the power transfer is in progress.

Figure 4:
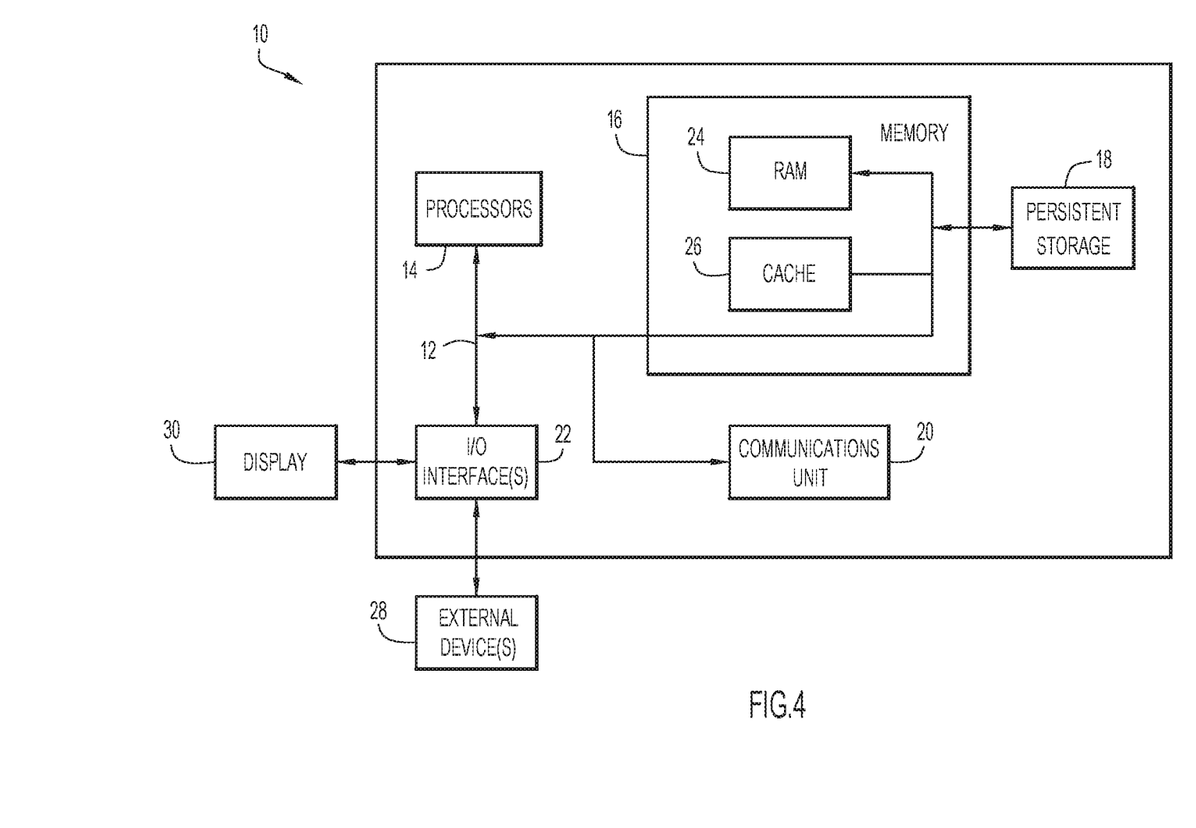
FIG. 4 is a block diagram depicting a computing device in accordance with an embodiment of the present invention.

FIG. 4 is a block diagram depicting components of a computer 10 suitable for executing the methods disclosed herein. Computer 10 may implement user devices 105A-105N in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to transferring power between devices (e.g., content data, content metadata, power source data, power transfer request data, etc.) may be stored within any conventional or other data structures (e.g., files, arrays, lists, stacks, queues, records, etc.) and may be stored in any desired storage unit (e.g., database, data or other repositories, queue, etc.). The data transmitted between user devices 105A and 105N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to transferring power between devices (e.g., content data, content metadata, power source data, power transfer request data, etc.) may include any information provided to, or generated by, any user device 105. Data relating to transferring power between devices may include any desired format and arrangement, and may include any quantity of any types of fields of any size to store any desired data. The data relating to transferring power between devices may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to transferring power between devices), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of transferring power between devices.

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., power management module 115, power transfer module 117, content application 120, etc.). These systems may include any types of monitors and input devices (e.g., keyboard, mouse, voice recognition, etc.) to enter and/or view information.

It is to be understood that the software (e.g., power management module 115, power transfer module 117, content application 120, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., power management module 115, power transfer module 117, content application 120, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to transferring power between devices). The database system may be implemented by any number of any conventional or other databases, data stores or storage structures (e.g., files, databases, data structures, data or other repositories, etc.) to store information (e.g., data relating to transferring power between devices).

The present invention embodiments may employ any number of any type of user interface (e.g., Graphical User Interface (GUI), command-line, prompt, etc.) for obtaining or providing information (e.g., data relating to transferring power between devices), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of transferring power between a plurality of devices comprising:
   displaying content on a first device to a group of users, wherein the first device includes a rechargeable power source;
   determining an amount of power required by the first device to at least complete display of the content based on an indicated length of the content and a rate of power consumption for displaying the content, wherein the indicated length and rate of power consumption are determined during playback of the content;
   determining that the amount of power required by the first device exceeds an amount of power in the rechargeable power source;
   identifying one or more second devices associated with users of the group, wherein the identified second devices each include a power source;
   wirelessly receiving power from the identified one or more second devices at the first device;
   determining that a level of interest, for the displayed content, of a user associated with the identified one or more second devices providing the power has surpassed a threshold level of interest and
   terminating the transfer of power.

2. The computer-implemented method of claim 1, wherein determining an amount of power comprises:
   determining an amount of power required by the first device to complete display of the content and perform one or more activities after completion of the display of content.

3. The computer-implemented method of claim 1, wherein identifying one or more second devices comprises:
   communicating with the one or more second devices to determine that the one or more second devices are capable of providing the power.

4. The computer-implemented method of claim 1, wherein wirelessly receiving power comprises:
   requesting approval of the transfer of power from the identified one or more second devices; and
   wirelessly receiving the power from the identified one or more second devices to the first device in response to the approval.

5. The computer-implemented method of claim 1, wherein wirelessly receiving power comprises:
   wirelessly receiving power from an identified second device at the first device; and
   in response to the first device requiring additional power, wirelessly receiving power from another identified second device at the first device.

6. A system for transferring power between a plurality of devices, the system comprising:
   one or more computer processors;
   one or more computer readable storage media;
   a rechargeable power source;
   program instructions stored on the one or more computer readable storage media for execution by at least one of the one or more computer processors, the program instructions comprising instructions to:
   display content to a group of users on the system;
   in response to displaying the content on the system, determine an amount of power required by the system to at least complete display of the content based on an indicated length of the content and a rate of power consumption for displaying the content, wherein the indicated length and rate of power consumption are determined during playback of the content;
   in response to the required amount of power exceeding power in the rechargeable power source:
   identify one or more devices associated with users of the group, wherein the identified one or more devices each include a power source;
   wirelessly receive power from the identified one or more devices; and
   terminate the transfer of power in response to determining that a detected level of interest, for the displayed content, of a user associated with the identified one or more devices providing the power has surpassed a threshold level of interest.

7. The system of claim 6, wherein the program instructions to determine an amount of power comprise instructions to:
   determine an amount of power required to complete display of the content and perform one or more activities after completion of the display of content.

8. The system of claim 6, wherein the program instructions to identify one or more second devices comprise instructions to:
   communicate with the one or more devices to determine that the one or more devices are capable of providing the power.

9. The system of claim 6, wherein the program instructions to wirelessly receive power comprise instructions to:
   request approval of the transfer of power from the identified one or more devices; and
   wirelessly receive the power from the identified one or more devices in response to the approval.

10. The system of claim 6, wherein the program instructions to wirelessly receive power comprise instructions to:
    wirelessly receive power from an identified device; and
    in response to the system requiring additional power, wirelessly receive power from another identified device.

11. A computer program product for transferring power between a plurality of devices, the computer program product comprising one or more computer readable storage media collectively having program instructions embodied therewith, the program instructions executable by a computer of a first device to cause the computer to:

display content on the first device to a group of users, wherein the first device includes a rechargeable power source;

in response to displaying the content on the first device, determine an amount of power required by the first device to at least complete display of the content based on an indicated length of the content and a rate of power consumption for displaying the content, wherein the indicated length and rate of power consumption are determined during playback of the content;

in response to the required amount of power exceeding power in the rechargeable power source:

identify one or more second devices associated with users of the group, wherein the identified second devices each include a power source;

wirelessly receive power from the identified one or more second devices; and terminate the transfer of power in response to determining that a detected level of interest, for the displayed content, of a user associated with the identified one or more second devices providing the power has surpassed a threshold level of interest.

12. The computer program product of claim 11, wherein the program instructions to determine an amount of power comprise instructions to:

determine an amount of power required by the first device to complete display of the content and perform one or more activities after completion of the display of content.

13. The computer program product of claim 11, wherein the program instructions to identify one or more second devices comprise instructions to:

communicate with the one or more second devices to determine that the one or more second devices are capable of providing the power.

14. The computer program product of claim 11, wherein the program instructions to wirelessly receive power comprise instructions to:

request approval of the transfer of power from the identified one or more second devices; and wirelessly receive the power from the identified one or more second devices to the first device in response to the approval.

15. The computer program product of claim 11, wherein the program instructions to wirelessly receive power comprise instructions to:

wirelessly receive power from an identified second device; and in response to the first device requiring additional power, wirelessly receive power from another identified second device.

* * * * *